(12) United States Patent
Castro Castro et al.

(10) Patent No.: US 10,476,970 B2
(45) Date of Patent: Nov. 12, 2019

(54) SERVICE REDIRECTION FROM A POLICY AND CHARGING CONTROL ARCHITECTURE

(75) Inventors: Fabian Castro Castro, Madrid (ES); Ana Maria Lopez Nieto, Madrid (ES); Irene Martin Cabello, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 119 days.

(21) Appl. No.: 13/885,343

(22) PCT Filed: Nov. 16, 2010

(86) PCT No.: PCT/EP2010/067548
§ 371 (c)(1),
(2), (4) Date: Jun. 17, 2013

(87) PCT Pub. No.: WO2012/065626
PCT Pub. Date: May 24, 2012

(65) Prior Publication Data
US 2014/0237129 A1    Aug. 21, 2014

(51) Int. Cl.
*H04L 12/14*    (2006.01)
*H04L 29/08*    (2006.01)
(Continued)

(52) U.S. Cl.
CPC ............ *H04L 67/147* (2013.01); *H04L 12/14* (2013.01); *H04L 12/1407* (2013.01);
(Continued)

(58) Field of Classification Search
CPC ............... H04L 29/06; H04L 29/08072; H04L 29/08576; H04L 29/0809; H04L 29/06537; H04L 63/102; H04W 12/08
See application file for complete search history.

(56) References Cited

U.S. PATENT DOCUMENTS 8,306,022 B1 * 11/2012 Cranor et al. ...... H04L 67/1034
370/328
2010/0146596 A1    6/2010 Stenfelt et al.
(Continued)

FOREIGN PATENT DOCUMENTS

CN    101150782 A    3/2008
CN    101370263 A    2/2009
(Continued)

OTHER PUBLICATIONS

EPO, Int'l Search Report in PCT/EP2010/067548, dated Feb. 8, 2011.
(Continued)

*Primary Examiner* — Vivek Srivastava
*Assistant Examiner* — Hien V Doan
(74) *Attorney, Agent, or Firm* — Patent Portfolio Builders PLLC

(57) ABSTRACT

For authorizing redirection services in a policy and charging control architecture, a policy and charging control rules function (PCRF) server determines control rules and redirection information per service in an internet protocol connectivity access network session, and a policy charging and enforcement function (PCEF) device receives control rules and redirection information per service basis, determines redirection per service request, and triggers the redirection. Upon a first request for a service, the PCEF device returns a redirection message with a redirection identifier; and upon completion of the service redirection, the first request for the service reaching the PCEF, the PCEF verifies the service is authorized and submits a service allowance toward the service server in charge of the service. Methods are also disclosed.

22 Claims, 7 Drawing Sheets

(51) Int. Cl.
*H04M 15/00* (2006.01)
*H04W 4/24* (2018.01)

(52) U.S. Cl.
CPC ........ *H04L 67/2814* (2013.01); *H04M 15/00* (2013.01); *H04M 15/66* (2013.01); *H04W 4/24* (2013.01)

(56) References Cited

U.S. PATENT DOCUMENTS

| | | | |
|---|---|---|---|
| 2011/0270722 A1 | 11/2011 | Cai et al. | |
| 2012/0036186 A1* | 2/2012 | Mariblanca Nieves | H04L 12/14 709/203 |
| 2012/0327787 A1* | 12/2012 | Mohammed | H04L 12/1407 370/242 |

FOREIGN PATENT DOCUMENTS

| | | | | |
|---|---|---|---|---|
| CN | 101877894 A | 11/2010 | | |
| EP | 2 641 356 B1 | 1/2015 | | |
| WO | 2008/133561 A1 | 11/2008 | | |
| WO | WO 2008133561 A1 * | 11/2008 | ........... | H04L 63/102 |
| WO | 2010/112080 A1 | 10/2010 | | |
| WO | WO 2010112080 A1 * | 10/2010 | ............ | H04L 12/14 |
| WO | 2012/063106 A1 | 5/2012 | | |

OTHER PUBLICATIONS

EPO, Int'l Preliminary Report on Patentability in PCT/EP2010/067548, dated Jan. 28, 2013.
3GPP, Policy and Charging Control Architecture, Technical Specification 23.203 V10.1.0, Sep. 2010.
Search Report issued by the State Intellectual Property Office of People's Republic of China in corresponding Chinese Application No. 201080070202.3, dated Jul. 13, 2015.
First Office Action issued by the State Intellectual Property Office of People's Republic of China in corresponding Chinese Application No. 201080070202.3, dated Jul. 27, 2015.
Office Action in corresponding Indonesian Patent Application No. WO02013002061 dated Oct. 12, 2015.
Cisco, "Chapter 10: Configuring Gx Support," Cisco Content Services Gateway—2nd Generation Release 3.5 Installation and Configuration Guide, Jun. 5, 2009, pp. 10-1-10-10.
Office Action in corresponding/related U.S. Appl. No. 16/043,224 dated May 1, 2019. (All references not submitted herewith have been previously made of record.).
Office Action in corresponding/related U.S. Appl. No. 16/043,224 dated Sep. 6, 2019. (All references not submitted herewith have been previously made of record.).

* cited by examiner

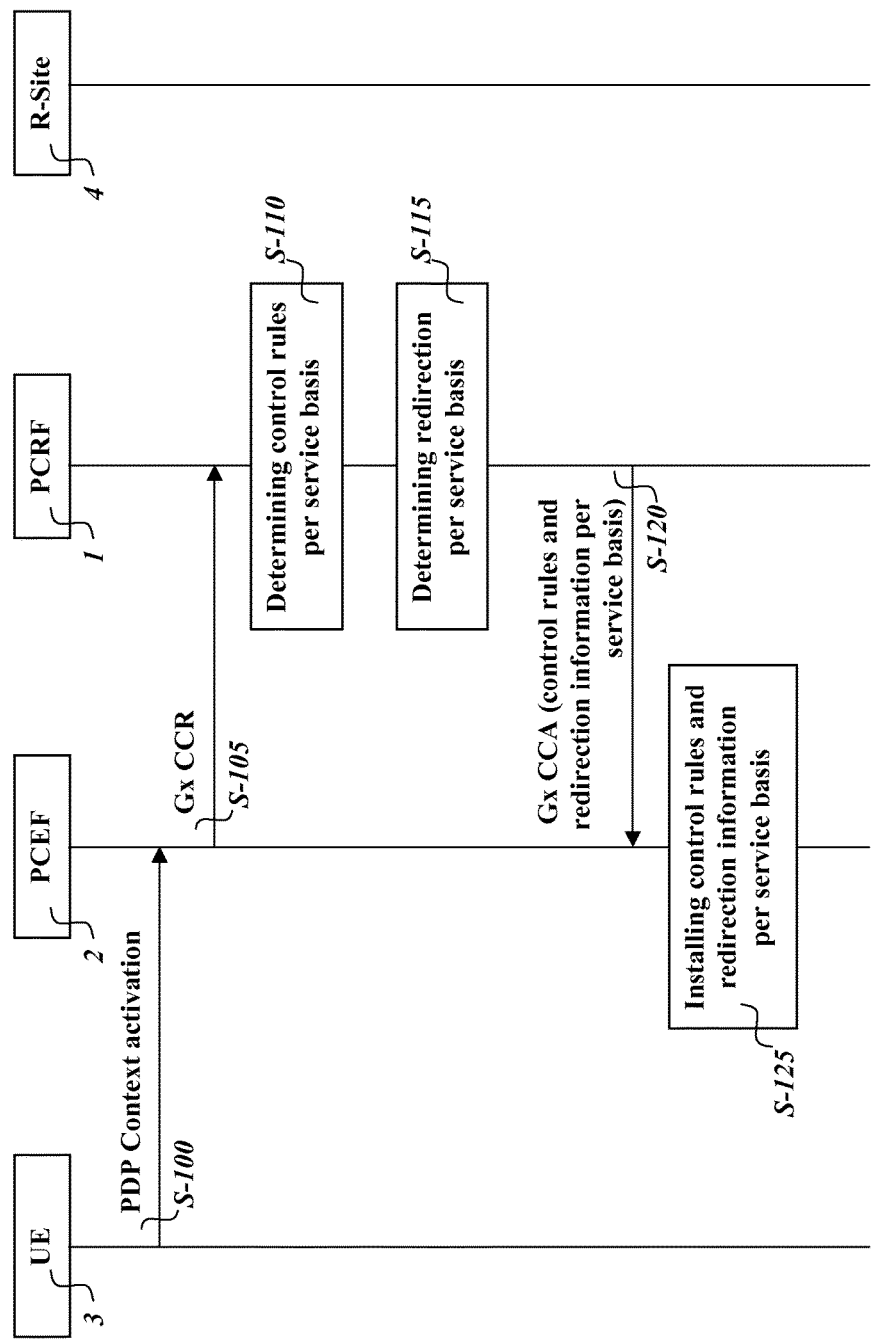
FIG. -1-

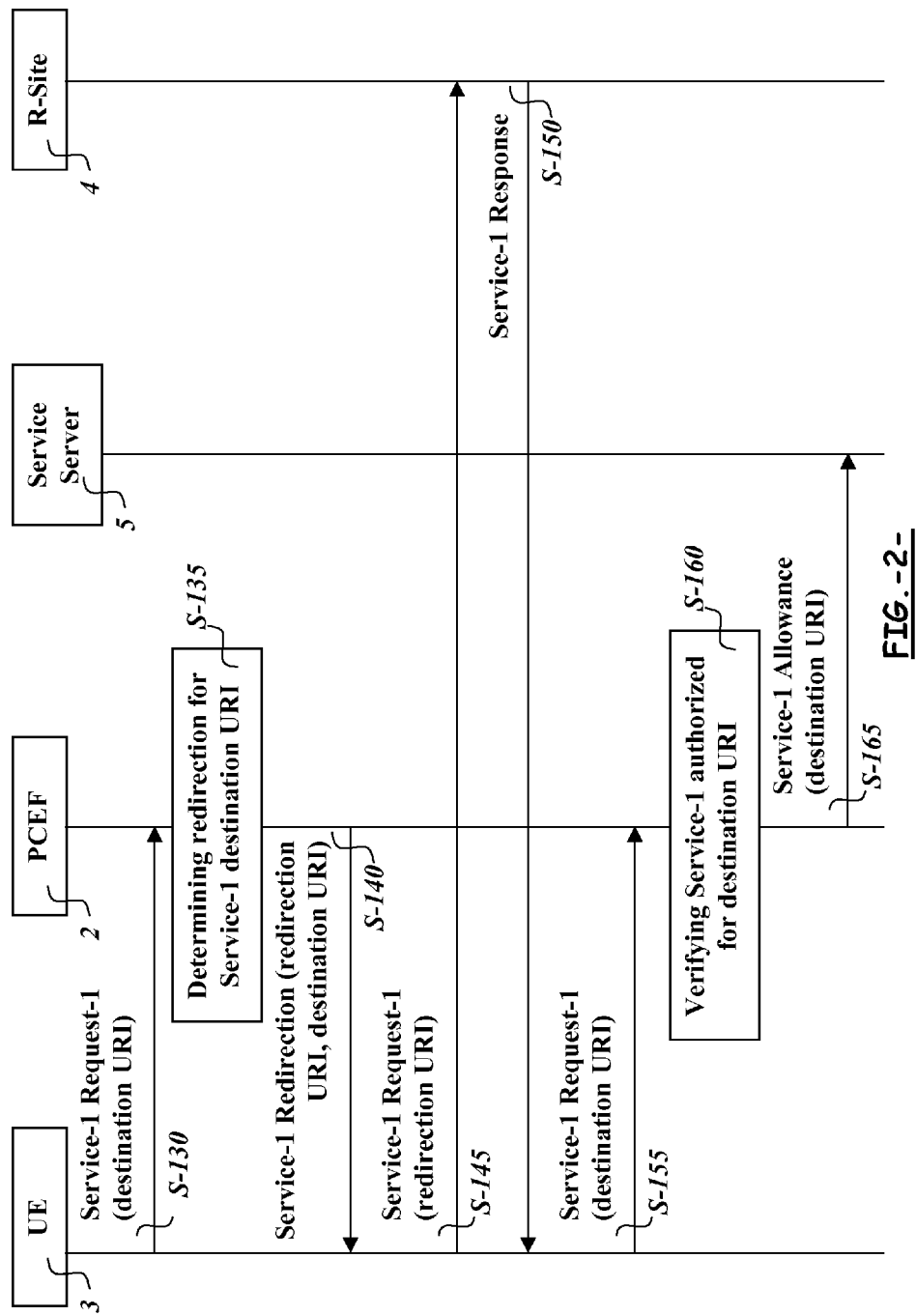

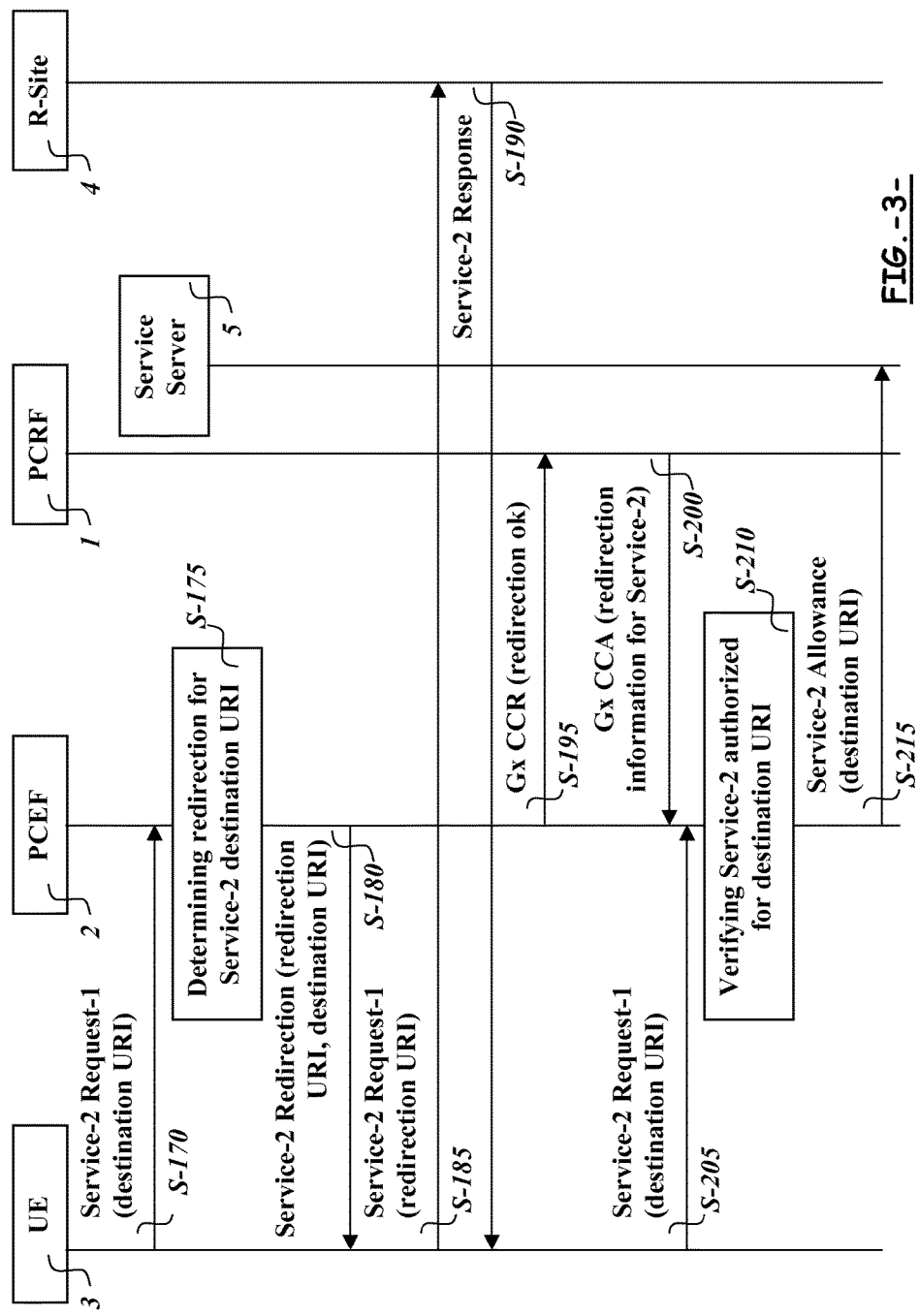
FIG. -3-

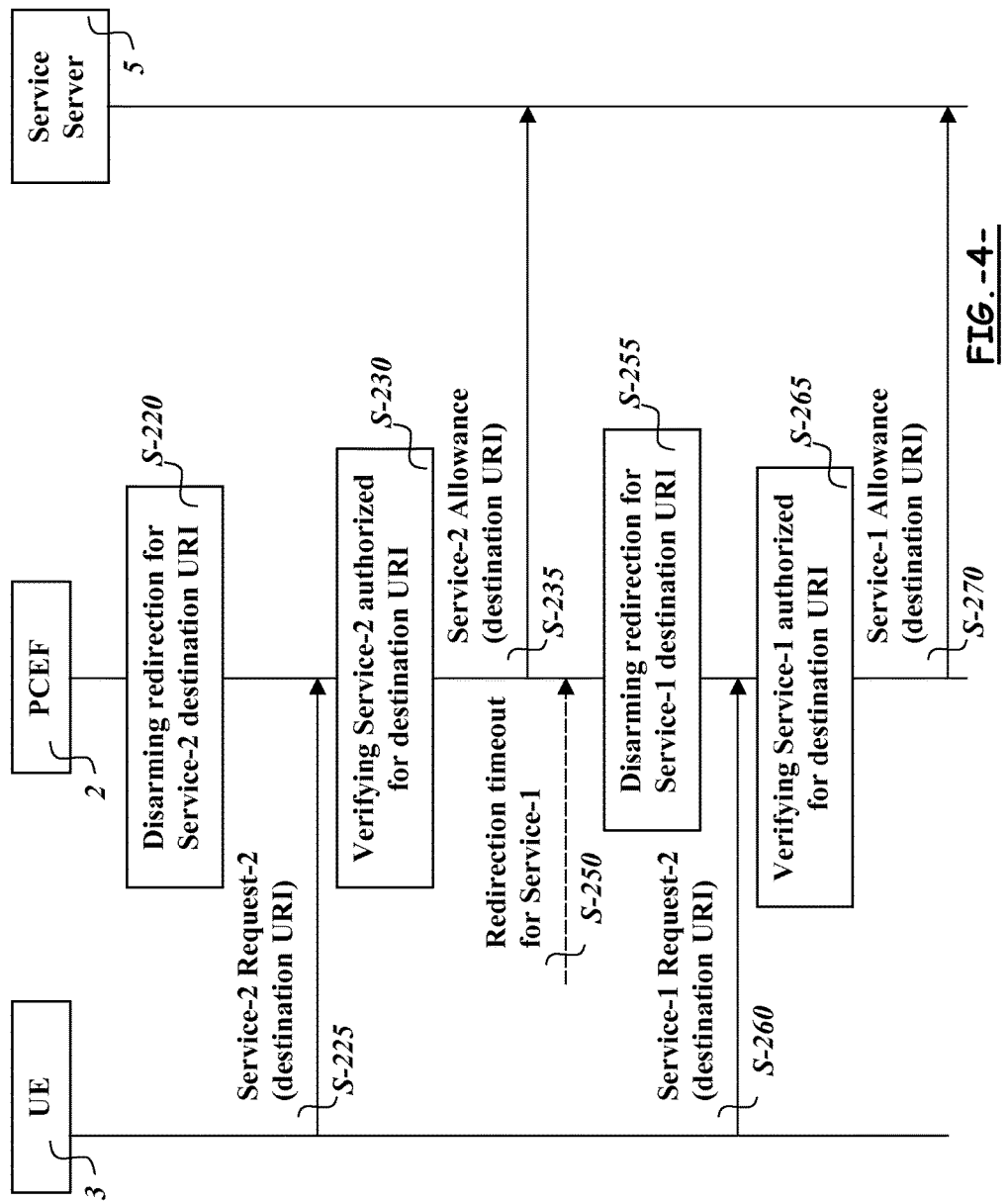
FIG. -4-

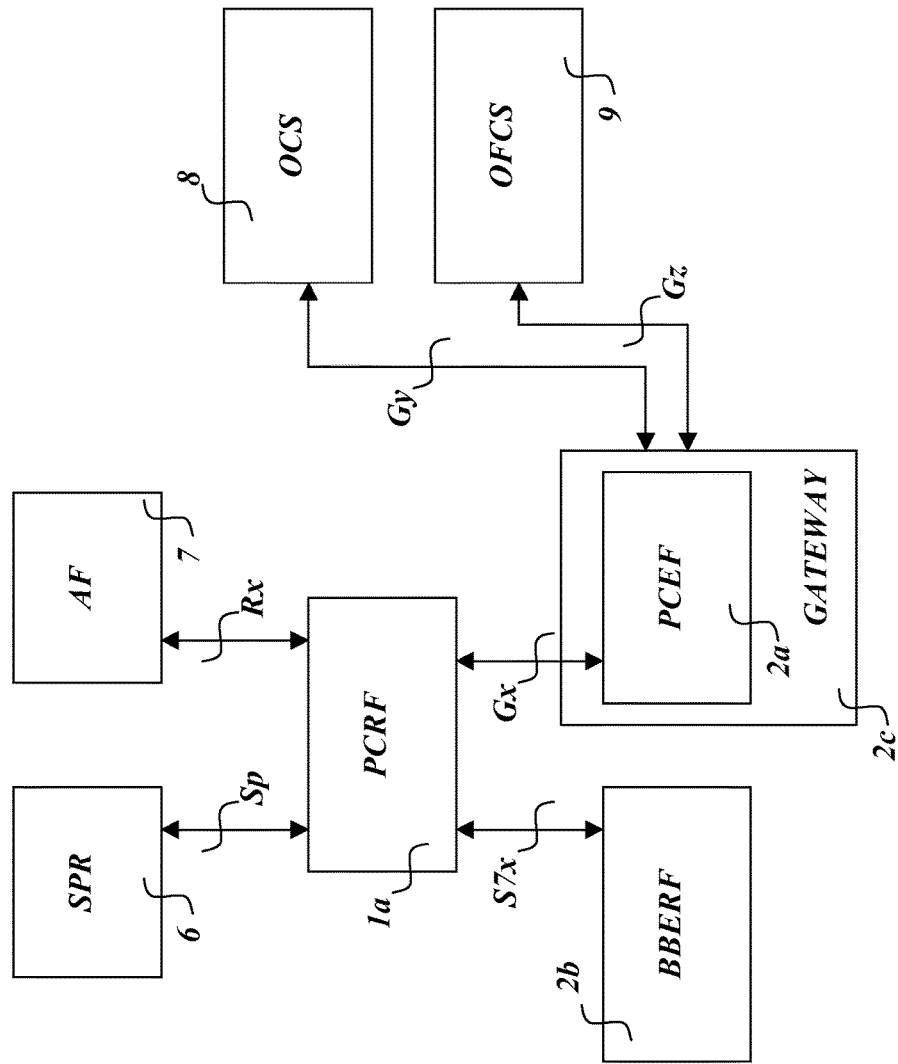
FIG. -5-

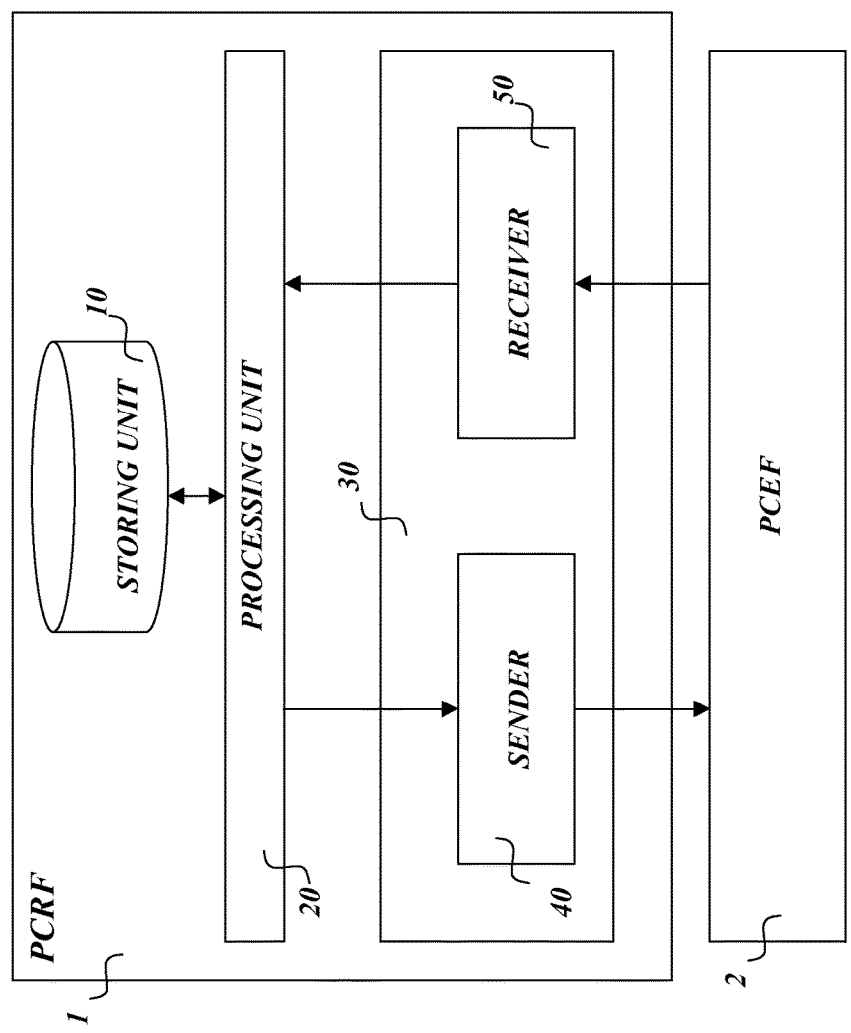
FIG. -6-

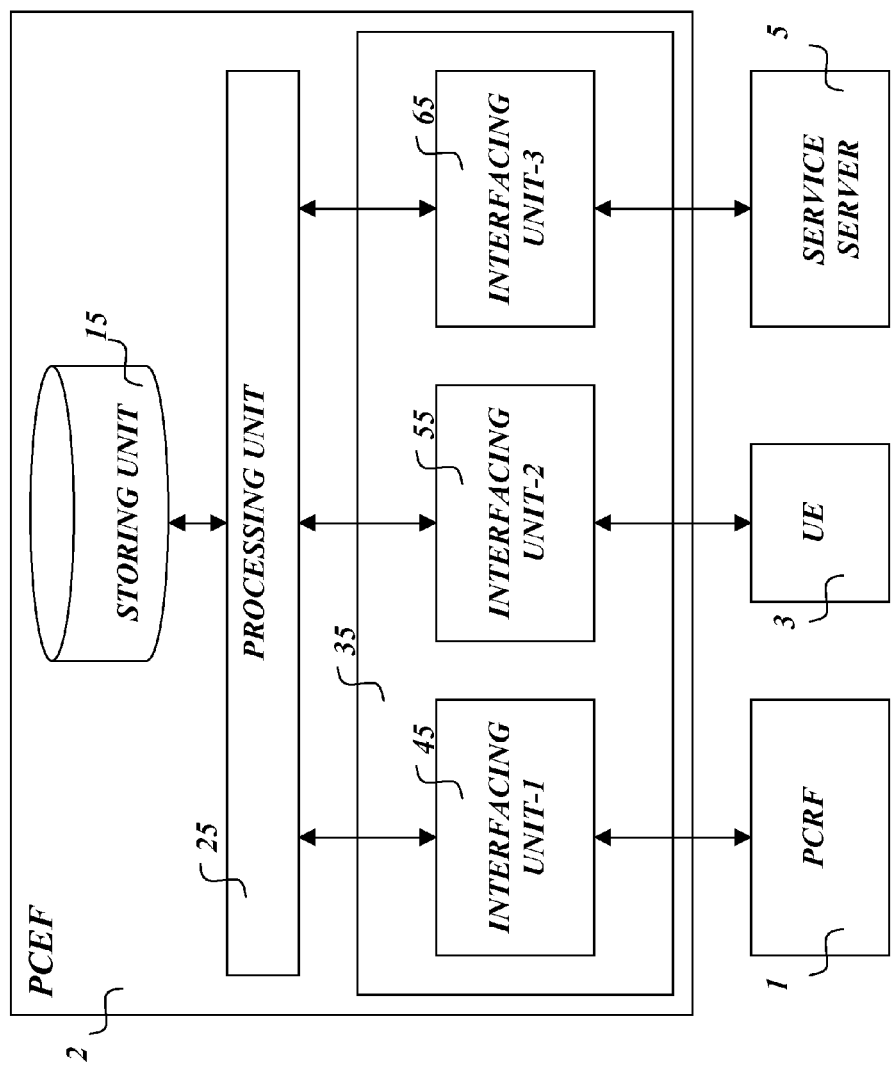
FIG. -7-

SERVICE REDIRECTION FROM A POLICY AND CHARGING CONTROL ARCHITECTURE

TECHNICAL FIELD

The present invention generally relates to authorization of services in a Policy and Charging Control architecture. More particularly, the invention pertains to authorization of services that require a redirection.

BACKGROUND

The Policy and Charging Control (hereinafter PCC) functionality is deployed in 3GPP TS 23.203 for Evolved 3GPP Packet Switched domain, including both 3GPP accesses (GERAN/UTRAN/E-UTRAN) and Non-3GPP accesses.

The PCC architecture includes, amongst other entities, a Policy and Charging Control Rules Function (hereinafter PCRF) in charge of policy control decision and flow based charging control functionalities, as well as in charge of provision of PCC rules to be enforced at the bearer layer; a Policy and Charging Enforcement Function (hereinafter PCEF) in charge of service data flow detection based on filters included in the PCC rules received from the PCRF, as well as in charge of PCC rules enforcement at the bearer layer; and an Application Function (hereinafter AF) for offering applications (in which the service is requested at a signalling layer whereas it is delivered at a bearer layer), the control of IP bearer resources according to what has been negotiated. This AF transfers dynamic session information to the PCRF, namely description of the media to be delivered at the bearer layer.

Regarding the communication between the above PCC entities, as disclosed in 3GPP TS 23.203, PCRF and PCEF communicate through a so-called Gx interface, whereas PCRF and AF communicate through a so-called Rx interface. In particular, the PCRF thus provides control rules to the PCEF through this Gx interface, whereas the AF provides the description of the media to be delivered at the bearer layer to the PCRF through this Rx interface.

Regarding the control rules submitted from the PCRF to the PCEF, these control rules include, although are not limited to, those PCC rules disclosed in 3GPP TS 23.203, and can be provided upon establishment or modification of an IP Connectivity Access Network (hereinafter IP-CAN) session.

Moreover, these control rules are determined or generated by the PCRF based on: information obtained from the AF via the Rx reference point, for example, the description of the media commented above, session data, and subscriber related information; information obtained from the PCEF through the Gx interface, for example IP-CAN bearer attributes, request type, subscriber related information and location information; information obtained from a Subscription Profile Repository (hereinafter SPR) through a so-called Sp interface, for example, subscriber and service related data; and other locally configured information at the PCRF.

Regarding the description of the media to be delivered at the bearer layer, which is provided from the AF to the PCRF, the description of the media may include one or more media components. A media component can be regarded as a portion of an AF session conveying information about media, such as media type, format, IP address, port(s), transport protocol, bandwidth, and direction. In this respect, the media described by a media component can be either bi- or unidirectional. On the other hand, media using the so-called Real-time Transport Protocol (hereinafter RTP) for transport may also have associated RTCP. If so, the media component also conveys information about the associated RTP Control Protocol (hereinafter RTCP), such as port and possibly bandwidth. Moreover, each media component may include media subcomponents, wherein each media subcomponent can be regarded as a portion of a media component describing a bi- or unidirectional IP flow.

At present, a huge variety of Internet Services have been developed wherein a user accessing a particular service site is redirected towards a different service site or Web portal. In particular, some user-initiated traffic may be redirected to an information page, where users can be informed about their current usage, or about a tariff change due to roaming, or because the user is out of his time range. Moreover, users might be requested to perform actions such as confirmation or acceptance of new conditions, buy a voucher, etc.

However, current PCC procedures and architectural elements are not prepared to handle this sort of redirection services and there is thus a need to determine in the PCC architecture what services require a redirection, and can be considered to be redirection services, what policies to apply and how to properly charge such redirection services; and, more specifically, in those scenarios where an effective service authorization depends on actions carried out during the redirection.

SUMMARY

The present invention is aimed to overcome or, at least, to mitigate the above drawbacks and provides for a new PCRF server and a new PCEF device arranged for supporting service redirections, and a new method of authorizing a service redirection in a PCC architecture.

In accordance with a first aspect of the present invention, there is provided a method of authorizing a service with a PCC architecture.

This method comprises the steps of: upon establishment or modification of an IP-CAN session with a UE, a PCEF device requesting control rules to a PCRF server; determining at the PCRF server control rules to be applied per service basis for the IP-CAN session; determining at the PCRF server, based on redirection policy criteria, those services for which a redirection is required; submitting from the PCRF server to the PCEF device the control rules and redirection information per service basis; installing at the PCEF device the received control rules and redirection information per service basis, an enforcing said control rules per services basis; upon a first service request from the UE for a service identified by a service destination identifier, the PCEF device determining that the service requires redirection and returning towards the UE a redirection message with a service redirection identifier and the service destination identifier; upon completion of service redirection, the first service request for the service identified by the service destination identifier reaching again the PCEF device; verifying at the PCEF device that the service identified by the service destination identifier can be authorized; and submitting a service allowance message for the first service request from the PCEF device towards a service server handling the service identified by the service destination identifier.

In particular, the redirection information per service basis may include a redirection activation indicator indicating whether the redirection is to be set or not for the service, and the service redirection identifier indicating where the UE is to be redirected for the service. Moreover, where the service destination identifier is a destination URI addressing the service server, the service redirection identifier may be a redirection URI addressing a site where the UE is to be redirected.

In order to provide a more autonomous handling of redirections to the PCEF device, the redirection information per service basis may further include a redirection expiry selected from: a time value during which redirection takes place, an event for which the redirection is set or reset, and a one-time indicator indicating the redirection for the first service request in the IP-CAN session and no further redirection for subsequent service requests in the IP-CAN session.

Particularly useful in this method, where the redirection information per service basis includes the one-time indicator, the method may further include a step of disarming the redirection after having redirected the first service request from the UE for the service, that is, the first request for a particular service.

Then, upon a second service request from the UE for the service, that is, a second or successive request for the same particular service, the method may further include a step of authorizing the service at the PCEF device without redirection, and a step of submitting a service allowance for the second service request from the PCEF device towards the service server handling the service identified by the service destination identifier.

Apart from that, the redirection information per service basis may further include at least one of: a redirection code indicating a reason for redirection, and a redirection confirmation indicating whether the PCRF server requires confirmation when redirection has been applied.

On the other hand, the redirection policy criteria may include at least one of dynamic conditions and usage conditions. In particular, the dynamic conditions may indicate whether the UE is in a roaming condition or in a non-roaming condition, or radio access type, or location, or combinations thereof, etc. Also in particular, the usage conditions may indicate the accumulated usage for the IP-CAN session, the usage limit for the IP-CAN session, the reset period for the accumulated usage, combinations thereof, etc.

In accordance with a second aspect of the present invention, there is provided a new PCEF device for enforcing control rules applicable during an IP-CAN session established with a UE.

This PCEF device comprises: a processing unit arranged for determining establishment or modification of an IP-CAN session with UE; a first interfacing unit arranged for requesting control rules to a PCRF server in charge of generating the control rules, and arranged for receiving the control rules and redirection information per service basis from the PCRF server; and wherein the processing unit is arranged for installing the received control rules and the redirection information per service basis.

This PCEF device also comprises a second interfacing unit arranged for receiving a service request from the UE for a service identified by a service destination identifier; wherein the processing unit is arranged for determining that the service requires redirection and is arranged for determining a service redirection identifier; and wherein the second interfacing unit is arranged for returning towards the UE a redirection message with the service redirection identifier and with the service destination identifier, and is arranged for receiving again, upon completion of the service redirection, the service request for the service identified by the service destination identifier.

The processing unit of this PCEF device is also arranged for verifying that the service identified by the service destination identifier can be authorized; and the PCEF device further comprises a third interfacing unit arranged for submitting a service allowance message for the service request towards a service server handling the service identified by the service destination identifier.

In particular, this PCEF device may further comprise a storing unit arranged for storing the redirection information per service basis, wherein the redirection information may include: a redirection activation indicator indicating whether the redirection is to be set or not for the service, and the service redirection identifier indicating where the UE is to be redirected for the service. Moreover, the storing unit may be arranged for storing the service destination identifier as a destination URI addressing the service server and for storing the service redirection identifier as a redirection URI addressing a site where the UE is to be redirected.

As already commented above, and in order to provide a more autonomous handling of redirections to the PCEF device, the storing unit of this PCEF device may be arranged for storing the redirection information per service basis, the redirection information including a redirection expiry selected from: a time value during which redirection takes place, an event for which the redirection is set or reset, and a one-time indicator indicating the redirection for the first service request in the IP-CAN session and no further redirection for subsequent service requests in the IP-CAN session.

Particularly useful in this case, where the redirection information per service basis includes the one-time indicator, the processing unit of the PCEF device may further be arranged for disarming the redirection after having redirected the service request from the UE for the service.

Then, upon a subsequent service request for the service received at the second interfacing unit from the UE, the processing unit of the PCEF device may be arranged for authorizing the service without redirection and the third interfacing unit may be arranged for submitting a service allowance message for the subsequent service request towards the service server handling the service identified by the service destination identifier.

In accordance with a third aspect of the present invention, there is provided a new PCRF server for generating control rules to be enforced by a PCEF device during an IP-CAN session established with a UE.

This PCRF server comprises: an interfacing unit arranged for receiving a request for control rules from a PCEF device in charge of enforcing the control rules; a processing unit arranged for determining control rules to be applied per service basis for the IP-CAN session; and arranged for determining, based on redirection policy criteria, those services for which a redirection is required; and wherein the interfacing unit arranged for submitting to the PCEF device the control rules and redirection information per service basis. The PCRF server may further comprise a storing unit arranged for storing the redirection information per service basis. In particular, this redirection information per service basis may include: a redirection activation indicator indicating whether the redirection is to be set or not for the service, and a service redirection identifier indicating where the UE is to be redirected for the service. In particular, the storing unit of the PCRF server may be arranged for storing the service redirection identifier as a redirection URI addressing a site where the UE is to be redirected.

Aligned with corresponding features commented above, and in order to provide a more autonomous handling of redirections to the PCEF device, the storing unit of the PCRF server may be arranged for storing the redirection information per service basis, this redirection information may include a redirection expiry selected from: a time value during which redirection takes place, an event for which the redirection is set or reset, and a one-time indicator indicating the redirection for the first service request in the IP-CAN session and no further redirection for subsequent service requests in the IP-CAN session.

Apart from that, the redirection policy criteria to be used by the PCRF server in determining service redirection per service basis may include at least one of dynamic conditions and usage conditions. Therefore, the storing unit of the PCRF server may be arranged for storing the redirection policy criteria. In particular, the dynamic conditions may indicate whether the UE is in a roaming condition or in a non-roaming condition, or radio access type, or location, or combinations thereof, etc; and the storing unit of the PCRF server may be arranged for storing these dynamic conditions. Also in particular, the usage conditions may indicate the accumulated usage made for the IP-CAN session, the usage limit set for the IP-CAN session, the reset period for the accumulated usage, combinations thereof, etc; and the storing unit of the PCRF server may be arranged for storing these usage conditions.

On the other hand, the invention may be practised by a computer program, in accordance with a fourth aspect of the invention, the computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which:

FIG. 1 illustrates a simplified view of the sequence of actions to be performed in order to determine those services that require a redirection, and to provide appropriate control rules and redirection information towards the bearer layer.

FIG. 2 shows a simplified view of the sequence of actions to be performed in accordance with the invention to redirect a first request received for an exemplary first service.

FIG. 3 shows a simplified view of the sequence of actions to be performed in accordance with the invention to redirect a first request received for an exemplary second service.

FIG. 4 shows exemplary sequence of actions to be performed for disarming redirection condition for different services.

FIG. 5 illustrates a simplified view of PCC architecture.

FIG. 6 illustrates a basic implementation of a PCEF device provided for in accordance with embodiments of the invention.

FIG. 7 illustrates a basic implementation of a PCRF server provided for in accordance with embodiments of the invention.

DETAILED DESCRIPTION

The following describes currently preferred embodiments of a PCRF server and a PCEF device, both operating in accordance with PCC architecture, and a method of authorizing a service for which a redirection may be determined by the PCC architecture.

FIG. 5 basically illustrates structural elements of the PCC architecture as disclosed in 3GPP TS 23.203 v10.1.0. In this PCC architecture, apart from the PCRF 1$a$, PCEF 2$a$ and AF 7 already discussed above, FIG. 5 shows a Bearer Binding and Event Reporting Function (hereinafter BBERF) 2$b$, which may be considered as a PCEF located in a visited network, interfacing with the PCRF 1$a$ through a so-called S7x interface; a Subscription Profile Repository (hereinafter SPR) 6, which stores subscription data for users, interfacing with the PCRF 1$a$ through a so-called Sp interface; an Online Charging System (hereinafter OCS) 8, which is in charge of handling online credit control for service data flow based charging, interfacing with the PCEF 2$a$ through a so-called Gy interface; and an Offline Charging System (hereinafter OFCS) 9, which is in charge of handling offline credit control for service data flow based charging, interfacing with the PCEF 2$a$ through a so-called Gz interface.

A conventional PCC architecture as shown in FIG. 5 may include the PCRF server 1 and the PCEF device 2, as disclosed throughout the present specification, in order to carry out the functions of conventional PCRF 1$a$ and PCEF 2$a$, as well as the distinguishing features provided for in accordance with the present invention and further discussed in the following. In particular, for the purpose of the present invention, the distinguishing features disclosed throughout the present specification in respect of the PCEF device 2 may well be applicable to, and included in, any BBERF server carrying out the functions of conventional BBERF 2$b$.

The FIG. 1 illustrates a sequence of actions that may be performed in determining those services that require a redirection. As FIG. 1 illustrates, establishment of an IP-CAN session with user equipment (hereinafter UE) 3 is carried out at the PCEF device 2 during a step S-100. In particular, the IP-CAN session establishment may be indicated by receiving at the PCEF device a so-called 'PDP Context Activation' from a UE, where the UE has accessed through a GPRS access network. In such particular case, the PCEF device may be included in a Gateway GPRS Support Node (hereinafter GGSN). More generally speaking, where the access network is other than a GPRS network, such as a wireless local area network (hereinafter WLAN), a $3^{rd}$ generation (hereinafter 3G) or $4^{th}$ generation (hereinafter 4G) access networks may be, the PCEF device 2 may be included in a corresponding gateway 2$c$, which is illustrated in FIG. 5, located at the bearer layer.

Moreover, even if not illustrated in any drawing, a similar behaviour as for the establishment of an IP-CAN session can be expected for the purpose of the present invention upon receipt at the PCEF device 2 of an IP-CAN session modification from the UE 3. Consequently, the following sequence of actions illustrated in FIG. 1, and carried out upon establishment of the IP-CAN session modification, can well be applied as well upon modification of an IP-CAN session previously established at the PCEF device 2 with the UE 3.

Still with reference to FIG. 1, upon establishment of the IP-CAN session with the UE 3 or upon modification of a previously established IP-CAN session, the PCEF device 2 requests during a step S-105 control rules to the PCRF server 1 for the IP-CAN session. In particular, this request may be carried out by submitting a so-called CCR message through the Gx interface.

The PCRF server 1 determines during a step S-110 control rules to be applied per service basis. In this respect, more than one different service may be invoked during a same IP-CAN session. In addition, during a step S-115 the PCRF server 1 may also determine per service basis, and based on redirection policy criteria, whether or not redirection is required. To this end, the PCRF server 1 might request previously or in parallel to the actions carried out during the steps S-110 or S-115 service data from the SPR 6 commented above, through the Sp interface illustrated in FIG. 5.

In particular, the redirection policy criteria may include at least one of dynamic conditions and usage conditions. In particular, the dynamic conditions may indicate whether the UE is in a roaming condition or in a non-roaming condition, or radio access type, or location, or combinations thereof, etc. Also in particular, the usage conditions may indicate the accumulated usage for the IP-CAN session, the usage limit for the IP-CAN session, the reset period for the accumulated usage, combinations thereof, etc.

Then, back to the actions illustrated in FIG. 1, the PCRF server 1 submits to the PCEF device 2 during a step S-120 the control rules and redirection information determined per service basis. In particular, this submission may be carried out by submitting a so-called CCA message through the Gx interface to the PCEF device. The PCEF device 2 installs the received control rules and redirection information per service basis during a step S-125 and enforces said control rules for traffic flows in the IP-CAN session.

In particular, the redirection information per service basis may include a redirection activation indicator indicating whether the redirection is to be set or not for the service, and a service redirection identifier indicating where the UE is to be redirected when requesting the service.

Some sequences of actions that may occur from this stage onwards, and which may be relevant for the purpose of the present invention, are exemplary depicted in FIG. 2 and FIG. 3 and discussed in the following.

For instance, FIG. 2 illustrates a sequence of actions to be carried out for an exemplary first service, whereas FIG. 3 illustrates another for an exemplary second service.

The sequence of actions illustrated in FIG. 2 starts with the reception at the PCEF device 2 during a step S-130 of a first request for the exemplary first service. In this respect, this exemplary first service is identified by a service destination identifier included in the first request. In particular, this service destination identifier may be a destination URI addressing the service server 5 in charge of executing or running the exemplary first service.

Then, the PCEF device 2 may determine during a step S-135 that this exemplary first service requires redirection. In such a case, the PCEF device 2 may return during a step S-140 towards the UE 3 a redirection message with a service redirection identifier and the received service destination identifier. In particular, the service redirection identifier may be a redirection URI addressing a redirection site 4 (hereinafter R-site) where the UE 3 is to be redirected.

The UE 3 receiving the redirection message from the PCEF device 2 redirects during a step S-145 the first request for the exemplary first service towards the R-site 4. The UE 3 may be requested to perform any action there, such as confirmation or acceptance of new service conditions, buy a voucher, etc. Once any required action has been performed, the R-site 4 issues during a step S-150 a service response for the exemplary first service towards the UE 3.

Once the service response for the exemplary first service is received at the UE 3, the redirection is completed and the original first request for the exemplary first service is submitted again towards the PCEF device 2 during a step S-155. The request also including the service destination identifier.

Optionally, and not illustrated in any drawing, the PCEF device 2 could receive a confirmation from the R-site 4 indicating that the redirection had been completed, and this confirmation might likely be submitted from the PCEF device 2 to the PCRF server 1. Alternatively, the confirmation may optionally be submitted from the R-site 4 directly to the PCRF server. These alternative options may be advantageous where a different operational handling is wanted for first and subsequent requests for any particular service.

The PCEF device 2, as receiving again the first request for the exemplary first service, verifies during a step S-160 that this exemplary first service, which is identified by the service destination identifier, can be authorized and the PCEF device may submit during a step S-165 a service allowance message for this exemplary first service towards the service server 5 in charge of handling the exemplary first service. In particular, where the service destination identifier is a destination URI, the service server may be addressed by such destination URI.

Moreover, in accordance with an embodiment of the invention, the redirection information per service basis may further include at least one of: a redirection code indicating a reason for redirection, and a redirection confirmation indicating whether the PCRF server requires confirmation when redirection has been applied.

For example, the embodiment illustrated in FIG. 3 starts with the reception at the PCEF device 2 during a step S-170 of a first request for an exemplary second service. As for the above embodiment discussed with reference to FIG. 2 for an exemplary first service, this exemplary second service is also identified by a service destination identifier included in this first request. In particular, this service destination identifier may be also a destination URI addressing the service server 5 in charge of executing or running the exemplary first service.

The PCEF device 2 may then determine during a step S-175 that this exemplary second service requires redirection, and the PCEF device 2 may return during a step S-180 towards the UE 3 a redirection message with a service redirection identifier and the received service destination identifier. In particular, the service redirection identifier may be also a redirection URI addressing an R-site 4 where the UE 3 is to be redirected.

The UE 3 receiving the redirection message from the PCEF device 2 redirects during a step S-185 the first request for the exemplary second service towards the R-site 4, wherein the UE 3 may be requested to perform any action. Once any required action has been performed, the R-site 4 issues during a step S-190 a service response for the exemplary second service towards the UE 3.

As for the above embodiment discussed with reference to FIG. 2 for an exemplary first service, optionally and not illustrated in any drawing, the PCEF device 2 might also receive under this embodiment a confirmation from the R-site indicating that the redirection had been completed. Alternatively, the PCEF device 2 may wait during a time gap after having submitted the redirection message towards the UE 3, or may proceed in parallel to submit a confirmation to the PCRF server 1 indicating redirection has been applied.

Whatever alternative is configured, taking into account those features supported by the PCEF device and the PCRF server, the PCEF device 2 may submit a confirmation to the PCRF server 1 during a step S-195 indicating the redirection of the UE 3 to the R-site 4. To this end, the so-called CCR message may be used through the Gx interface from the PCEF device 2 towards the PCRF server 1 including the confirmation of redirection.

On the other hand, as already commented above and not illustrated in any drawing, the R-site 4 may directly submit a confirmation to the PCRF server 1 indicating that the redirection had been completed. Where this alternative is carried out, the confirmation discussed immediately above, whereby the PCEF device 2 confirms during the step S-195 the completion of redirection to the PCRF server likely with a CCR message, may be superfluous and omitted in this sequence of actions illustrated in FIG. 3.

As a result of confirming the completion of redirection to the PCRF server 1 by any alternative discussed above, the PCRF server 1 may determine some additional or alternative redirection information, and return this additional or alternative redirection information to the PCEF device 2 during a step S-200. To this end, the so-called CCA message may be used through the Gx interface from the PCRF server 1 towards the PCEF device 2 including the additional or alternative redirection information, if any.

If such additional or alternative redirection information were included, it would be installed for the exemplary second service at the PCEF device 2, and would be applied for this first request for the exemplary second service, if still on time, or for further requests for the exemplary second service, if the first request has already been treated or is not involved in such additional or alternative redirection information.

Once the service response for the exemplary first service had been received at the UE 3, the redirection is completed. Then, the UE 3 submits the original first request for the exemplary second service towards the PCEF device 2, and the latter receives again during a step S-205 such first request for the exemplary second service. The request also including the service destination identifier.

The PCEF device 2, as receiving again the first request for the exemplary second service, verifies during a step S-210 that this exemplary second service, which is identified by the service destination identifier, can be authorized and the PCEF device may submit during a step S-215 a service allowance message for this exemplary second service towards the service server 5 in charge of handling the exemplary second service. In particular, where the service destination identifier is a destination URI, the service server may be addressed by such destination URI.

In order to carry out embodiments of the above method, there is provided in accordance with an embodiment of the invention a PCRF server 1, as illustrated in FIG. 6, for generating control rules to be enforced by the PCEF device 2 for an IP-CAN session established with a UE 3, and a PCEF device 2, as illustrated in FIG. 7, for enforcing the control rules applicable for the IP-CAN session established with the UE 3.

This PCRF server 1 illustrated in FIG. 6 comprises an interfacing unit 30 arranged for receiving a request for control rules from a PCEF device 2 in charge of enforcing the control rules; a processing unit 20 arranged for determining control rules to be applied per service basis for the IP-CAN session; and arranged for determining, based on redirection policy criteria, those services for which a redirection is required. The interfacing unit 30 of this PCRF server is arranged for submitting to the PCEF device the control rules and redirection information per service basis. In particular, the interfacing unit 30 may be arranged for receiving the request for control rules in a so-called CCR message through the Gx interface, and for submitting to the PCEF device the control rules and redirection information in a so-called CCA message through the Gx interface. More particularly, the interfacing unit 30 may include a sender 40 for submissions towards the PCEF device and a receiver 50 for receptions from the PCEF device.

Apart from that, the PCRF server 1 may further comprise a storing unit 10 arranged for storing the redirection information per service basis. This redirection information per service basis may include a redirection activation indicator indicating whether the redirection is to be set or not for the service, and a service redirection identifier indicating where the UE is to be redirected for the service. In particular, the storing unit 10 may be arranged for storing the service redirection identifier as a redirection URI addressing the R-site 4 where the UE is to be redirected.

As already commented above, the redirection policy criteria may include at least one of dynamic conditions and usage conditions. Therefore, the storing unit 10 of the PCRF server 1 may be arranged for storing the redirection policy criteria. In particular, the dynamic conditions may indicate whether the UE is in a roaming condition or in a non-roaming condition, or radio access type, or location, or combinations thereof, etc; and the storing unit 10 of the PCRF server 1 may be arranged for storing these dynamic conditions. Also in particular, the usage conditions may indicate the accumulated usage made for the IP-CAN session, the usage limit set for the IP-CAN session, the reset period for the accumulated usage, combinations thereof, etc; and the storing unit 10 of the PCRF server 1 may be arranged for storing these usage conditions.

The PCEF device 2 illustrated in FIG. 7 comprises a processing unit 25 arranged for determining establishment or modification of an IP-CAN session with a UE 3; a first interfacing unit 45 arranged for requesting control rules to the PCRF server 1 in charge of generating the control rules; and arranged for receiving the control rules and redirection information per service basis from the PCRF server 1; and wherein the processing unit is arranged for installing the received control rules and the redirection information per service basis as well as for enforcing said control rules per service basis. In particular, the interfacing unit 45 may be arranged for requesting the control rules with a so-called CCR message through the Gx interface, and for receiving from the PCRF server the control rules and redirection information in a so-called CCA message through the Gx interface.

The PCEF device 2 also comprises a second interfacing unit 55 arranged for receiving a service request from the UE for a service identified by a service destination identifier; and wherein the processing unit is arranged for determining that the service requires redirection and for determining a service redirection identifier. In particular, this second interfacing unit 55 is arranged for receiving from the UE 3 any establishment or modification of an IP-CAN session.

Moreover, the second interfacing unit 55 of the PCEF device 2 is also arranged for returning towards the UE a redirection message with the service redirection identifier and with the service destination identifier; and is also arranged for receiving again, upon completion of the service redirection, the service request for the service identified by the service destination identifier; whereas the processing unit 25 is arranged for verifying that the service identified by the service destination identifier can be authorized.

Furthermore, the PCEF device 2 also includes a third interfacing unit 65 arranged for submitting a service allowance message for the service request towards a service server 5 handling the service identified by the service destination identifier.

In particular, the first, second and third interfacing units of the PCEF device 2 may be provided as respectively separate units 45, 55 and 65, or as an integral interfacing unit arranged for communicating with the PCRF server 1, the UE 3 and the service server 5.

In addition, the PCEF device 2 may further comprise a storing unit 15 for storing the redirection information per service basis. This redirection information may include a redirection activation indicator indicating whether the redirection is to be set or not for the service, and the service redirection identifier indicating where the UE is to be redirected for the service. In particular, the storing unit 15 may be arranged for storing the service destination identifier as a destination URI addressing the service server 5 and for storing the service redirection identifier as a redirection URI addressing the R-site 4 where the UE is to be redirected.

Apart from what has been commented above with regard to the redirection information, and which may be applicable for both above embodiments, some more operational information elements can be included in the redirection information in order to better adapt the PCC architecture to different handling of services for different services, and being still compatible with the above embodiments.

In this respect, in accordance with an embodiment of the invention fully compatible with the above previous embodiments, the redirection information per service basis may further include a redirection expiry selected from: a time value during which redirection takes place, an event for which the redirection is set or reset, and a one-time indicator indicating the redirection for the first service request in the IP-CAN session and no further redirection for subsequent service requests in the IP-CAN session.

These operational information elements, which are usable in determining the redirection expiry for any particular service, allow for interrupting, or even stopping, the redirection for further requests related to any particular service. For instance, where the redirection information includes as redirection expiry a time value during which redirection takes place, a timer is triggered at the PCEF device 2 when installing the redirection information for the particular service and, upon expiry of such timer, the redirection is stopped for subsequent requests for the particular service. As a further instance, where the redirection information includes as redirection expiry an event for which the redirection is set or reset, the PCEF device 2 tracks the performance of the particular service to detect such event; for example, where an explicit acceptance by the UE of amended service conditions is to be required and after that acceptance no further redirection takes place for subsequent requests for the particular service. As a still further instance, where the redirection information includes as redirection expiry an one-time indicator indicating the redirection for the first service request in the IP-CAN session and no further redirection for subsequent service requests in the IP-CAN session, the PCEF device 2 may, on its own and without further participation of the PCRF server 1, stop the redirection for subsequent requests for the particular service, once the redirection for the first request has been accomplished; this may be particularly useful where the redirection takes place only to inform the UE of any particular service feature or where no explicit action by the UE is required other than visiting the R-site.

FIG. 4 illustrates some embodiments for different services for which some of the above redirection expiry elements had been determined at the PCRF server 1 and installed at the PCEF device 2.

As shown in FIG. 4, the PCEF device may disarm during a step S-220 the redirection for the exemplary second service. This may be due to the additional or alternative redirection information lately received at the PCEF device 2 from the PCRF server 1 for the exemplary second service during the step S-200 and already discussed above with reference to FIG. 3. More particularly, additional or alternative redirection information may have included a particular event for which the redirection is reset, such as once the first request has been allowed.

Apart from that, even if no additional or alternative redirection information had been received during the previous step S-200, the sequence of actions illustrated for the exemplary second service in FIG. 4 may also be due to the receipt of an one-time indicator as redirection expiry at the PCEF device indicating the redirection for the first request of the exemplary second service in the IP-CAN session and no further redirection for subsequent requests of the exemplary second service in the IP-CAN session.

That is, where the redirection information for a particular service includes the one-time indicator, the method further includes a step S-220 of disarming the redirection after having redirected the first service request from the UE for the particular service.

Even if FIG. 4 shows this step of disarming the redirection only for the exemplary second service, for which additional or alternative redirection information might have been received as illustrated in FIG. 3, the receipt of an one-time indicator as redirection expiry for the first exemplary service at the PCEF device, which is not illustrated in any drawing, also makes the PCEF device disarming the redirection after having redirected the first service request from the UE for the exemplary first service, so that no further redirection for subsequent requests of the exemplary first service in the IP-CAN session occur.

Thus, where the redirection has been disarmed at the PCEF device 2 for the exemplary second service, a second request for the exemplary second service received at the PCEF device 2 during a step S-225, as shown in FIG. 4, is determined not to be redirected, and the PCEF device 2 can verify during a step S-230 that this exemplary second service, which is identified by the service destination identifier, can be authorized.

Then, the PCEF device may submit during a step S-235 a service allowance message for this exemplary second service towards the service server 5 in charge of handling the exemplary second service. In particular, where the service destination identifier is a destination URI, the service server may be addressed by such destination URI.

On the other hand, FIG. 4 also shows an embodiment representative of a case where the redirection information for the exemplary first service had included as redirection expiry a time value during which redirection takes place. As already commended above, a timer was triggered at the PCEF device 2 when installing the redirection information for this exemplary first service, which is not illustrated in any drawing.

As shown in FIG. 4, upon expiry of such timer during a step S-250 for the exemplary first service, the PCEF device 2 may disarm during a step S-255 the redirection for the exemplary first service.

Afterwards, a second request for the exemplary first service received at the PCEF device 2 during a step S-260, as shown in FIG. 4, is determined not to be redirected, and the PCEF device 2 can verify during a step S-265 that this exemplary first service, which is identified by the service destination identifier, can be authorized.

As for the previous embodiment shown for the exemplary second service in this FIG. 4, the PCEF device may also submit during a step S-270 a service allowance message for this exemplary first service towards the service server 5 in charge of handling the exemplary first service. In particular, where the service destination identifier is a destination URI, the service server may be addressed by such destination URI.

That is, after having disarmed the redirection for any particular service, such as the exemplary first and second services, and due to any of the reasons discussed above in respect of FIG. 4, upon a further request from the UE for the particular service, the method further includes a step of authorizing the particular service at the PCEF device without redirection, and a step of submitting a service allowance for the further request from the PCEF device towards the service server handling the service identified by the service destination identifier.

In order to carry out advantageous embodiments of the above method, the storing unit 10 of the PCRF server 1 illustrated in FIG. 6 may be arranged for storing the redirection information per service basis, wherein the redirection information further includes a redirection expiry selected from: a time value during which redirection takes place, an event for which the redirection is set or reset, and a one-time indicator indicating the redirection for the first service request in the IP-CAN session and no further redirection for subsequent service requests in the IP-CAN session.

Likewise, the storing unit 15 of the PCEF device 2 illustrated in FIG. 7 may be arranged for storing the redirection information per service basis, wherein the redirection information further includes a redirection expiry selected from: a time value during which redirection takes place, an event for which the redirection is set or reset, and a one-time indicator indicating the redirection for the first service request in the IP-CAN session and no further redirection for subsequent service requests in the IP-CAN session. Moreover, where the redirection information per service basis includes the one-time indicator, the processing unit 25 of the PCEF device 2 may be further arranged for disarming the redirection after having redirected the service request from the UE for the service. Furthermore, after having disarmed the redirection, upon a subsequent service request for the service received at the second interfacing unit 55 from the UE, the processing unit 25 may be arranged for authorizing the service without redirection, and the third interfacing unit 65 may be arranged for submitting a service allowance message for the subsequent service request towards the service server 5 handling the service identified by the service destination identifier.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of authorizing a service with a policy and charging control (PCC) architecture, the method comprising:

upon establishment or modification of an internet protocol (IP) connectivity access network (IP-CAN) session with a user equipment (UE), requesting, by a policy and charging enforcement function (PCEF) device, PCC rules from a policy and charging control rules function (PCRF) server;

responsive to receiving the request for PCC rules, at the PCRF server, upon establishment or modification of the IP-CAN session:

determining, at the PCRF server, PCC rules to be applied per service basis for the IP-CAN session;

determining, at the PCRF server based on redirection policy criteria, a service for which a redirection is required;

submitting, from the PCRF server to the PCEF device, the PCC rules per service basis and redirection information for the service for which the redirection is required, wherein the redirection information for the service for which the redirection is required includes a service redirection identifier indicating where the UE is to be redirected for the service for which the redirection is required;

installing, at the PCEF device, the received PCC rules per service basis and the redirection information for the service for which the redirection is required;

upon a first service request from the UE for a service identified by a service destination identifier, determining, by the PCEF device based on the redirection information received from the PCRF and the PCC rules per service basis, that the service identified by the service destination identifier is the service for which redirection is required, and returning toward the UE a redirection message with the service redirection identifier and the service destination identifier; and after completion of service redirection the first service request for the service identified by the service destination identifier reaching again the PCEF device;

verifying at the PCEF device that the service identified by the service destination identifier can be authorized; and submitting a service allowance message for the first service request from the PCEF device toward a service server handling the service identified by the service destination identifier.

2. A method of authorizing a service with a policy and charging control (PCC) architecture, the method comprising:

upon establishment or modification of an internet protocol (IP) connectivity access network (IP-CAN) session with a user equipment (UE), requesting, by a policy and charging enforcement function (PCEF) device, PCC rules from a policy and charging control rules function (PCRF) server;

determining, at the PCRF server, PCC rules to be applied per service basis for the IP-CAN session;

determining, at the PCRF server based on redirection policy criteria, a service for which a redirection is required;

submitting, from the PCRF server to the PCEF device, the PCC rules per service basis and redirection information for the service for which the redirection is required, wherein the redirection information for the service for which the redirection is required includes a service redirection identifier indicating where the UE is to be redirected for the service for which the redirection is required and a redirection activation indicator indicating whether the redirection is to be set or not;

installing, at the PCEF device, the received PCC rules per service basis and the redirection information for the service for which the redirection is required;

upon a first service request from the UE for a service identified by a service destination identifier, determining, by the PCEF device based on the redirection information received from the PCRF and the PCC rules per service basis, that the service identified by the service destination identifier is the service for which redirection is required, and returning toward the UE a redirection message with the service redirection identifier and the service destination identifier; and after completion of service redirection
the first service request for the service identified by the service destination identifier reaching again the PCEF device;
verifying at the PCEF device that the service identified by the service destination identifier can be authorized; and
submitting a service allowance message for the first service request from the PCEF device toward a service server handling the service identified by the service destination identifier.

3. The method of claim 2, wherein the service destination identifier is a destination uniform resource identifier (URI) addressing the service server, and the service redirection identifier is a redirection URI addressing a site where the UE is to be redirected.

4. The method of claim 2, wherein the redirection information for the service for which the redirection is required further includes a redirection expiry selected from a time value during which redirection takes place, an event for which the redirection is set or reset, and a one-time indicator indicating the redirection for the first service request in the IP-CAN session and no further redirection for subsequent service requests in the IP-CAN session.

5. The method of claim 2, wherein the redirection information for the service for which the redirection is required further includes at least one of a redirection code indicating a reason for redirection, and a redirection confirmation indicating whether the PCRF server requires confirmation when redirection has been applied.

6. The method of claim 4, wherein the redirection information for the service for which the redirection is required includes the one-time indicator and the method further includes disarming the redirection after having redirected the first service request from the UE for the service identified by the service destination identifier.

7. The method of claim 6, wherein upon a second service request from the UE for the service identified by the service destination identifier, the method further includes authorizing the service identified by the service destination identifier at the PCEF device without redirection, and submitting a service allowance for the second service request from the PCEF device toward the service server handling the service identified by the service destination identifier.

8. The method of claim 1, wherein the redirection policy criteria include at least one of dynamic conditions and usage conditions.

9. A policy and charging enforcement function (PCEF) device of a policy and charging control (PCC) architecture for enforcing PCC rules applicable during an internet protocol (IP) connectivity access network (IP-CAN) session established with a user equipment (UE), the PCEF device comprising:

a PCEF processing unit to determine establishment or modification of an IP-CAN session with a UE;
a first PCEF interfacing unit to request, upon establishment or modification of the IP-CAN session, PCC rules from a policy and charging control rules function (PCRF) server in charge of generating the PCC rules; and to receive, in response to the request for PCC rules, the PCC rules per service basis and redirection information for a service for which a redirection is required from the PCRF server, wherein the redirection information for the service for which the redirection is required includes a service redirection identifier indicating where the UE is to be redirected for the service for which the redirection is required;
wherein the PCEF processing unit installs received PCC rules per service basis and the redirection information for the service for which the redirection is required;
a second PCEF interfacing unit to receive a service request from the UE for a service identified by a service destination identifier;
wherein the PCEF processing unit determines, based on the redirection information received from the PCRF and the PCC rules per service basis, that the service identified by the service destination identifier is the service for which redirection is required, and determines the service redirection identifier;
wherein the second PCEF interfacing unit returns toward the UE a redirection message with the service redirection identifier and with the service destination identifier; and
wherein after completion of the service redirection
the second PCEF interfacing unit receives again the service request for the service identified by the service destination identifier;
the PCEF processing unit verifies that the service identified by the service destination identifier can be authorized; and
a third PCEF interfacing unit to submit a service allowance message for the service request toward a service server handling the service identified by the service destination identifier.

10. The PCEF device of claim 9, further comprising a memory to store the redirection information for the service for which the redirection is required, wherein the redirection information for the service for which the redirection is required includes a redirection activation indicator indicating whether the redirection is to be set or not.

11. The PCEF device of claim 10, wherein the memory stores the service destination identifier as a destination uniform resource identifier (URI) addressing the service server and stores the service redirection identifier as a redirection URI addressing a site where the UE is to be redirected.

12. The PCEF device of claim 10, wherein the memory stores the redirection information for the service for which the redirection is required, the redirection information for the service for which the redirection is required including a redirection expiry selected from a time value during which redirection takes place, an event for which the redirection is set or reset, and a one-time indicator indicating the redirection for the first service request in the IP-CAN session and no further redirection for subsequent service requests in the IP-CAN session.

13. The PCEF device of claim 12, wherein the redirection information for the service for which the redirection is required includes the one-time indicator and the PCEF processing unit disarms the redirection after having redirected the service request from the UE for the service identified by the service destination identifier.

14. The PCEF device of claim 13, wherein upon a subsequent service request for the service identified by the service destination identifier received at the second PCEF interfacing unit from the UE, the PCEF processing unit authorizes the service identified by the service destination identifier without redirection and the third PCEF interfacing unit submits a service allowance message for the subsequent service request toward the service server handling the service identified by the service destination identifier.

15. A policy and charging control rules function (PCRF) server of a policy and charging control (PCC) architecture for generating PCC rules to be enforced by a policy and charging enforcement function (PCEF) device during an internet protocol (IP) connectivity access network (IP-CAN) session established with a user equipment (UE), the PCRF server comprising:
  a PCRF interfacing unit to receive a request for PCC rules, upon establishment or modification of the IP-CAN session, from a policy and charging enforcement function (PCEF) device in charge of enforcing the PCC rules; and
  a PCRF processing unit to determine, responsive to receiving the request for PCC rules at the PCRF server:
    PCC rules to be applied per service basis for the IP-CAN session; and
    a service for which a redirection is required prior to the PCEF device verifying that the service is authorized, wherein the determination is based on redirection policy criteria;
  wherein the PCRF interfacing unit, responsive to receiving the request for PCC rules at the PCRF server, submits to the PCEF device the PCC rules per service basis and redirection information for the service for which the redirection is required, and wherein the redirection information for the service for which the redirection is required includes a service redirection identifier indicating where the UE is to be redirected for the service for which the redirection is required.

16. The PCRF server of claim 15, wherein the redirection information for the service for which the redirection is required includes a redirection activation indicator indicating whether the redirection is to be set or not for the service, and the PCRF server further comprises a memory to store the redirection information for the service for which the redirection is required.

17. The PCRF server of claim 16, wherein the memory stores the service redirection identifier as a redirection uniform resource identifier (URI) addressing a site where the UE is to be redirected.

18. The PCRF server of claim 16, wherein the memory stores the redirection information for the service for which the redirection is required, and the redirection information for the service for which the redirection is required includes a redirection expiry selected from a time value during which redirection takes place, an event for which the redirection is set or reset, and a one-time indicator indicating the redirection for a first service request in the IP-CAN session and no further redirection for subsequent service requests in the IP-CAN session.

19. The PCRF server of claim 15, wherein the redirection policy criteria include at least one of dynamic conditions and usage conditions, and the PCRF server further comprises a memory to store the redirection policy criteria.

20. The method of claim 1, wherein the service for which redirection is required is a service for which redirection is required prior to the PCEF verifying that the service is authorized.

21. The method of claim 2, wherein the service for which redirection is required is a service for which redirection is required prior to the PCEF verifying that the service is authorized.

22. The PCEF device of claim 9, wherein the service for which redirection is required is a service for which redirection is required prior to the PCEF verifying that the service is authorized.

* * * * *

UNITED STATES PATENT AND TRADEMARK OFFICE
CERTIFICATE OF CORRECTION

| | | |
|---|---|---|
| PATENT NO. | : 10,476,970 B2 | Page 1 of 1 |
| APPLICATION NO. | : 13/885343 | |
| DATED | : November 12, 2019 | |
| INVENTOR(S) | : Castro Castro et al. | |

It is certified that error appears in the above-identified patent and that said Letters Patent is hereby corrected as shown below:

On the Title Page

In Column 1, below Item (54), insert Item -- (71) Applicant: TELEFONAKTIEBOLAGET LM ERICSSON (PUBL), Stockholm, (SE) --.

In Column 1, below "TITLE", Line 1, delete item "(75)" and insert item -- (72) --, therefor.

Signed and Sealed this
First Day of September, 2020

Andrei Iancu
*Director of the United States Patent and Trademark Office*